United States Patent
Houghton et al.

(10) Patent No.: US 12,118,784 B2
(45) Date of Patent: Oct. 15, 2024

(54) METHODS AND SYSTEMS FOR IMAGE PROCESSING

(71) Applicant: RPS Group, Inc., Abingdon (GB)

(72) Inventors: Dave Houghton, Abingdon (GB); Patrick Rath, Abingdon (GB)

(73) Assignee: RPS Group, Inc., Abingdon (GB)

( * ) Notice: Subject to any disclaimer, the term of this patent is extended or adjusted under 35 U.S.C. 154(b) by 0 days.

(21) Appl. No.: 18/321,547

(22) Filed: May 22, 2023

(65) Prior Publication Data

US 2024/0296675 A1   Sep. 5, 2024

(30) Foreign Application Priority Data

Mar. 2, 2023 (GB) ..................... 2303122

(51) Int. Cl.
| | |
|---|---|
| *G06K 9/00* | (2022.01) |
| *G06V 10/36* | (2022.01) |
| *G06V 10/764* | (2022.01) |
| *G06V 20/10* | (2022.01) |
| *G06V 20/17* | (2022.01) |
| *G06V 10/10* | (2022.01) |
| *G06V 10/778* | (2022.01) |
| *G06V 10/82* | (2022.01) |

(52) U.S. Cl.
CPC ............ *G06V 20/194* (2022.01); *G06V 10/36* (2022.01); *G06V 10/764* (2022.01); *G06V 20/17* (2022.01); *G06V 10/16* (2022.01); *G06V 10/7788* (2022.01); *G06V 10/82* (2022.01); *G06V 2201/05* (2022.01); *G06V 2201/10* (2022.01)

(58) Field of Classification Search
CPC ...... G06V 20/13; G06V 10/143; G06V 10/58; G06V 10/7715; G06V 20/194; G06V 2201/05; G06V 20/52; G06V 20/693; G06V 10/96; G01J 3/2823; G01J 3/44; G01J 3/02; G01J 3/0264; G01J 3/027; G01J 3/36; G01J 3/0218
See application file for complete search history.

(56) References Cited

U.S. PATENT DOCUMENTS

| | | | | |
|---|---|---|---|---|
| 2006/0239537 | A1* | 10/2006 | Shragai | G06T 5/50 348/42 |
| 2013/0272626 | A1* | 10/2013 | Robinson | G06T 5/70 382/275 |
| 2018/0330623 | A1* | 11/2018 | Fujita | G08G 5/006 |

(Continued)

FOREIGN PATENT DOCUMENTS

WO   2012063241 A1   5/2012

OTHER PUBLICATIONS

Baur, J.; Steinberg, G.; Nikulin, A.; Chiu, K.; de Smet, T.S. Applying Deep Learning to Automate UAV-Based Detection of Scatterable Landmines. Remote Sens. 2020 (Year: 2020).*

(Continued)

*Primary Examiner* — Alex Kok S Liew
(74) *Attorney, Agent, or Firm* — DLA Piper LLP (US)

(57) ABSTRACT

Methods and systems for image processing for detection of devices are disclosed. Image data can be received. The image data can be filtered to provide output image data. The output image data can be classified. A pallet can be applied for displaying the classified image data

20 Claims, 11 Drawing Sheets
(7 of 11 Drawing Sheet(s) Filed in Color)

(56) References Cited

U.S. PATENT DOCUMENTS

2019/0073534 A1   3/2019  Dvir et al.
2022/0074713 A1   3/2022  Malka et al.

OTHER PUBLICATIONS

J. S. Silva, I. F. L. Guerra, J. Bioucas-Dias and T. Gasche, "Landmine Detection Using Multispectral Images," in IEEE Sensors Journal, vol. 19, No. 20, pp. 9341-9351, 15 Oct. 15, 2019 (Year: 2019).*

Achkar R., et al., "Implementation of a Vision System for a Landmine Detecting Robot Using Artificial Neural Network," International Journal of Artificial Intelligence Applications, Sep. 30, 2012, vol. 3, No. 5, pp. 73-92, Retrieved from the Internet: URL:https://arxiv.org/pdf/1210.7956.

Extended European Search Report for Application No. 24160818.1, dated Jul. 18, 2024, 10 pages.

Guo H., et al., "UAV-Borne Landmine Detection via Intelligent Multispectral Fusion," 2022 4th International Conference on Applied Machine Learning, IEEE, Jul. 23, 2022, pp. 179-183.

Makki I., et al., "A Survey of Landmine Detection Using Hyperspectral Imaging," ISPRS Journal of Photogrammetry and Remote Sensing, Dec. 29, 2016, vol. 124, pp. 40-53.

Makki I., et al., "RBF Neural Network for Landmine Detection in Hyperspectral Imaging," 2018 7th European Workshop on Visual Information Processing, IEEE, Nov. 26, 2018, pp. 1-6.

Office Action for Great Britain Patent Application No. GB2303122.2, mailed Jul. 30, 2024, 8 pages.

* cited by examiner

METHODS AND SYSTEMS FOR IMAGE PROCESSING

This application claims benefit to Great Britain Patent Application No. 2303122.2, filed on Mar. 2, 2023. This application is incorporated herein by reference in its entirety.

DESCRIPTION OF DRAWINGS

This application/patent file contains at least one drawing executed in color. Copies of this patent application publication with color drawing(s) will be provided by the US PTO upon request and payment of the necessary fee.

DETAILED DESCRIPTION OF EMBODIMENTS

Figure 1:
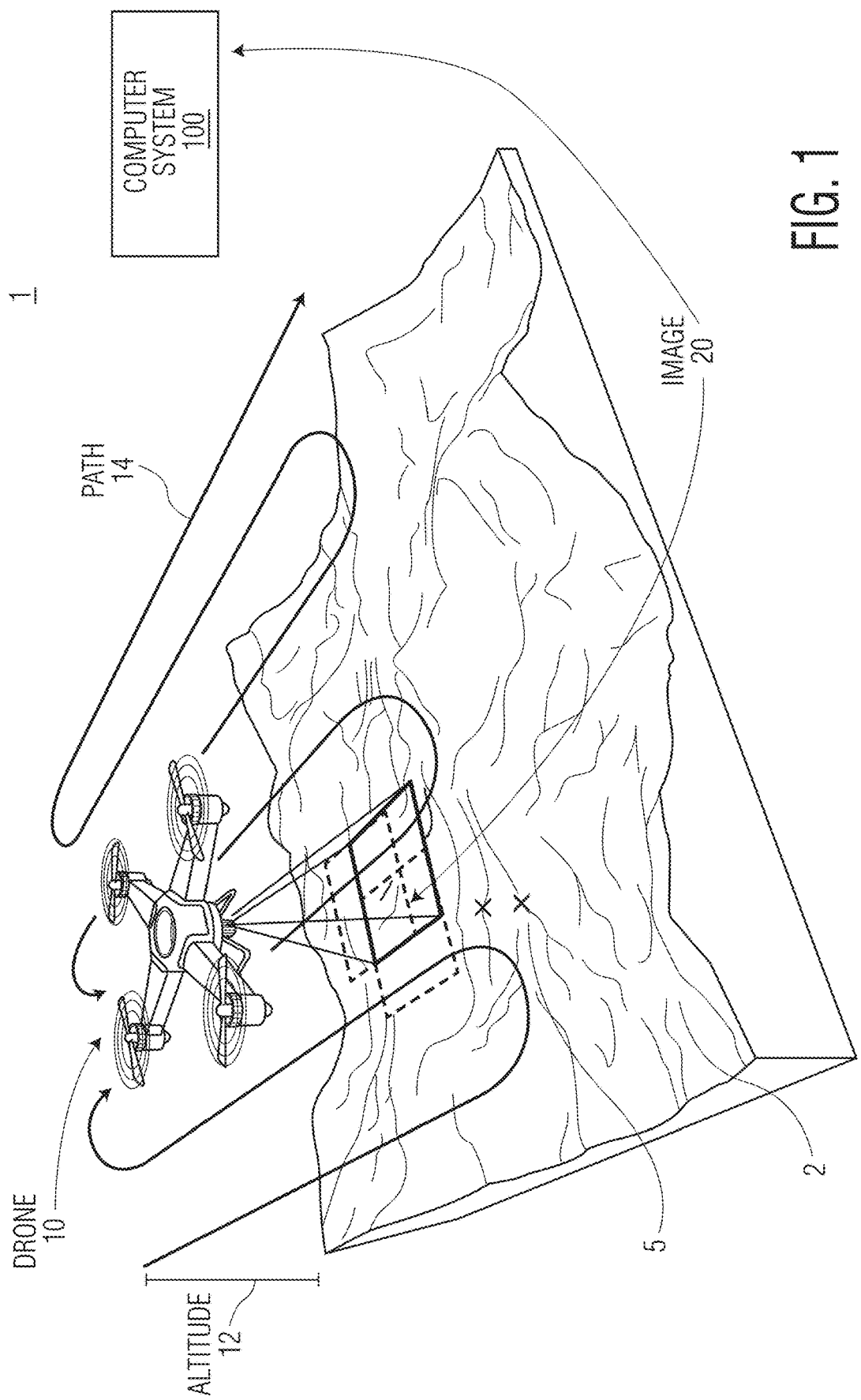
FIG. 1 shows an example of a system for surveying a landscape for mine detection according to an embodiment of the invention.

Landmines can come in various types, e.g. anti-personnel or anti-tank, may be buried or on the surface, magnetic or non-magnetic, and can be left behind after warfare posing a humanitarian threat. ERW can comprise unexploded ordnance (UXO) and abandoned explosive ordnance (AXO), but may not include mines according to some definitions. UXO can be weapons that fail to detonate as intended. These unstable explosive devices can be left behind during and after conflicts and can pose dangers similar to landmines. Abandoned explosive ordnance (AXO) can be explosive ordnance that may not have been used during armed conflict and may have been left behind and may no longer be under control of the party that left it behind. It may or may not have been primed, fused, armed, or otherwise prepared for use. They can pose similar dangers to landmines, particularly where prepared for use.

Demining or mine clearance can be the process of removing land mines from an area to a given depth and make the land safe for human use. The area to be cleared can be surveyed to detect the location of landmines. Once found, mines can be generally defused and/or blown up with explosives.

Detection and removal of landmines can be a hazardous activity. Thus, detecting landmines and accurately determining their exact position can be a component of the process of safely clearing mines.

Various methods for detecting landmines may be used. Electromagnetic methods can be used, such as ground penetrating radar, which may be used in tandem with metal detectors. Acoustic methods can sense the cavity created by mine casings. Sensors can detect vapor leaking from landmines. Specially trained dogs or other animals can also be used to narrow down the search and verify that an area is cleared. Many methods rely on ground based techniques, which can be dangerous, can rely on subjective decision making, can be of limited accuracy, and can lack the ability to look beyond the immediate area to incorporate other factors and clues from the landscape that could inform the detection decision.

The survey area can be extensive, leading to many hours of controlled data collection using UAV (e.g. drones) equipped with various payloads (cameras, batteries, memory devices etc.). Subsequently, the high resolution imagery can be downloaded from the device and put through existing commercial software to post-process the raw data into human readable orthorectified photography. This can comprise of true colour layers (red, green and blue) as well as any other layers (near infra-red) related to the capabilities of the onboard digital camera.

The resulting imagery can then be loaded into a Geographical Information System (e.g. QGIS, ArcGIS) for analysts to systemically review and manually identify the presence of hazardous objects. This process can be time consuming and can require human expertise to identify and mark the exact location of such objects.

An embodiment of the invention relates to a computer implemented method of image processing for detection of explosive devices, the method can comprise any combination of the following:
  receiving aerial multispectral or hyperspectral image data covering an area of terrain;
  wherein the images comprise plural spectral channels in the electromagnetic spectrum;
  filtering the image data to provide output image data according to at least one filter in which each pixel value is a function of the plural input image pixel values, wherein the filter passes high reflectance from buried or surface explosive devices;
  classifying the output image data into plural classes according to a classification scheme;
  and applying a colour palette for displaying the classified image data.

The output may then be displayed for review by an operator. The image transformation described above can be sensitive to high reflectance from buried or surface explosive devices and can display the results in a form which can enable landmines to be more easily detected by an operator. A challenge can be to process and/or interpret the images to cope with the extreme dependence of performance on environmental conditions, e.g. different lighting conditions, shadow, etc. Many of the surface effects can vary over time, e.g. caused by weathering. The image transformation techniques can combine plural channels, which may for instance include infrared channels instead of or in combination with RGB or other channels, and can apply a custom classification and pallet to their display to make the processed images highly sensitive to landmine and other explosive device signatures and thus can aid a human operator in detecting landmines from the aerial survey.

Another embodiment of the invention can relate to a computer implemented method of detecting landmines or other explosive device, the method can comprise any combination of the following:
image processing for detection of explosive devices, the method comprising:
receiving aerial multispectral or hyperspectral image data covering an area of terrain;
sampling the image data to provide image samples;
preprocessing the image samples;
input the preprocessed image samples to a model trained to detect the presence or absence of a landmine or other explosive device in the image data, wherein the first model is a convolutional neural network which automatically outputs a heat map prediction of whether or not a landmine or explosive device is present;
providing output to a user indicating the predictions.

Thus, a user may be guided in performing manual detection of mines or validate a prediction made by AI in an automatic detection mode. Such manual detections/validations can be saved in a database to be used in training AI to perform future detections.

The embodiments described herein may be combined in any way. For instance, the filtering step of the first embodiment may be applied to the image data before being input to the neural network model in the second model to aid the model in learning and detecting landmines.

An embodiment can include a data processing pipeline consisting of any combination of the following:
1. Manage the loading of very large, high-resolution imagery in smaller memory efficient blocks.
2. Read and store the image metadata (geographic coordinate system, pixel resolution etc.)
3. Methods to post-process the image (e.g. resizing and sharpening)
4. A deep convolutional neural network previously trained on thousands of land mine instances in varying terrains designed to detect the presence of land mines in the image and return bounding-box coordinates.
5. A final data process to merge and consolidate the detections into a single file (can be GeoJSON, ESRI Shapefile) that can be read by GIS and visualize the positions of predicted surface anti-tank landmines.
6. The final outputs to augment the analysts in the identification of surface land mines and to (in some embodiments, dramatically) reduce the time to identify a "hotspot" where landmines are located in long strategic strips.

The AI may draw attention to likely areas of landmines, e.g., hotspots. A strip of objects can be a clue, e.g., corresponding to a known layout. A huge image might be segmented with a grid and different operators allocated a cell, but may miss the bigger picture.

Figure 2:
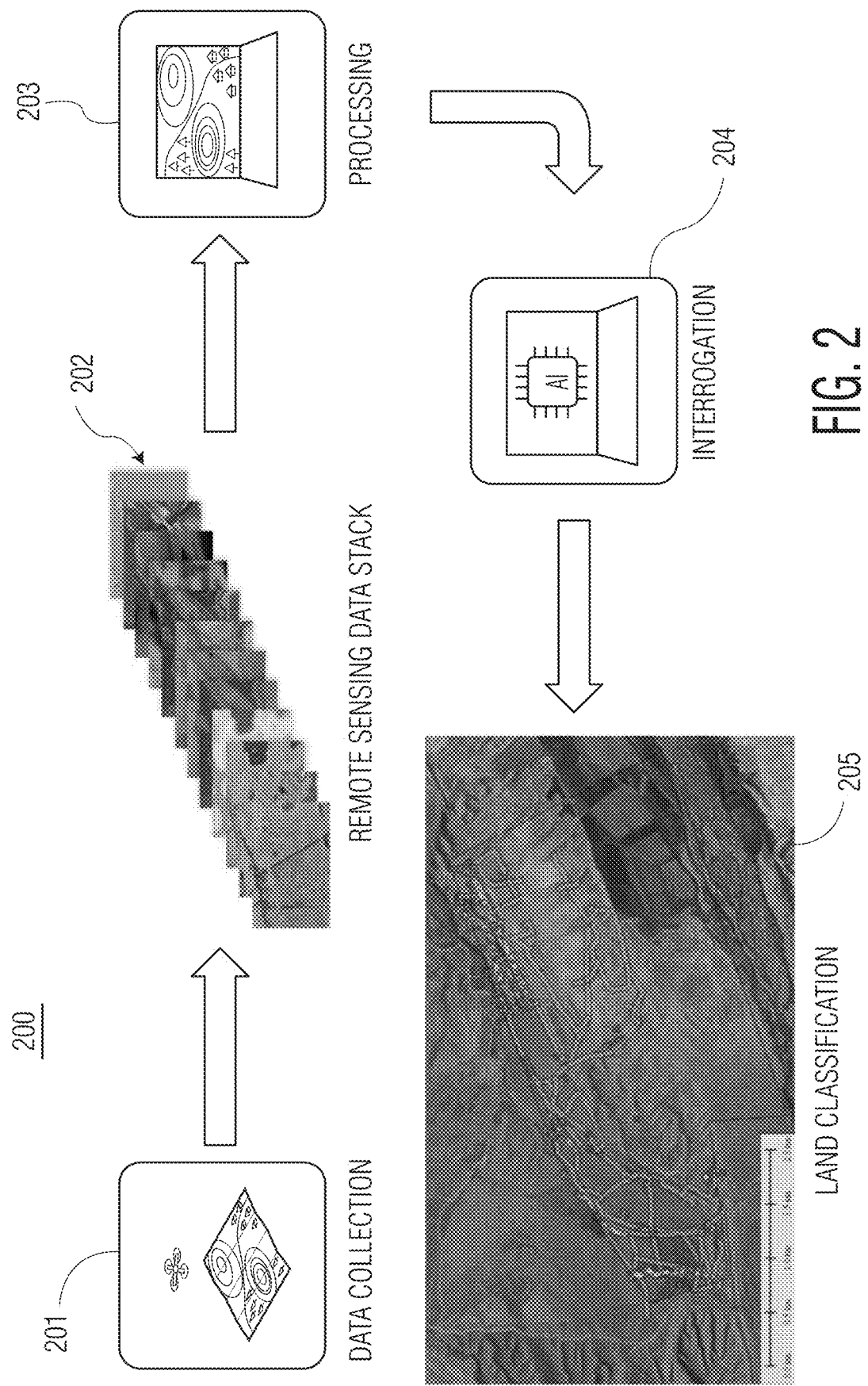
FIG. 2 shows a process for surveying a landscape for mine detection according to an embodiment of the invention.

FIG. 1 shows an example of a system 1 for surveying a landscape 2 for detection of landmines 5 according to an embodiment of the invention. FIG. 2 shows a process 200 for surveying a landscape 2 for mine 5 detection according to an embodiment of the invention.

At step 201 of the process, a data collection step can be performed in which an Unmanned Autonomous Vehicle (UAV) 10, which can be referred to as a drone, can be flown at a predetermined altitude 12 in a path 14 over an area 1 which may be surveyed for landmine 5 detection capturing image data 20 of the landscape 2.

At step 202, the remote sensing data stack comprising the captured images 20 can be transferred to computing system 100 for processing at step 203. The processing may include stitching together and calibrating the image data, performing various transformations and combining the various channels to extract features corresponding to the signatures of landmines, as described in more detail below.

At step 204, the transformed data can be interrogated to detect landmines using, for instance AI trained on historic labeled data to detect signatures of landmines in the transformed imaged data.

At step 205, the land can be classified according to the detection results such that a map is created of suspected landmine positions for use in clearance activities.

In more detail, the drone 10 can capture one or more images 20 of the landscape below as it flies. The precise implementation may vary, but generally drone operators can alter flight settings, such as duration, area, altitude 12 and flightpath 14, which can be controlled by the drone's in-built GPS receivers and compass, although aspects of this may be automated by software. A flightpath 14 can be devised such that the images 20 cover the entirety of the area of interest. There may be overlap between adjacent images to help "stitch" them together when the images are processed.

Camera settings can also be adjusted to change resolution or image overlap—drone mapping can take multiple geo-tagged images that can be overlapped (e.g. by 80%) and can then "stitched" together using "orthomosaicing" software (e.g., such as Agisoft Metashape, Pix4D, FlytBase, Avica Cloud, Airteam Fusion Platform) to give a complete high-resolution image of an area which may also have been photogrammetrically orthorectified to correct for geometric distortion and/or color balancing.

The images 20 can be transferred to a separate computer system 100 for further processing. This might be done in real-time, e.g. via wireless communication channel (e.g. Wi-Fi radios, cellular phones such as 3G/4G/LTE/5G, UHF radios and/or radios.) established between the drone and computer system, or via saving the images to local storage on the drone, e.g. in jpeg or tiff format, on a memory card, which can be transferred to and or connected to the computer system 100 post flight, such that the images can be accessed, processed and analyzed by the computer system.

Figure 3:
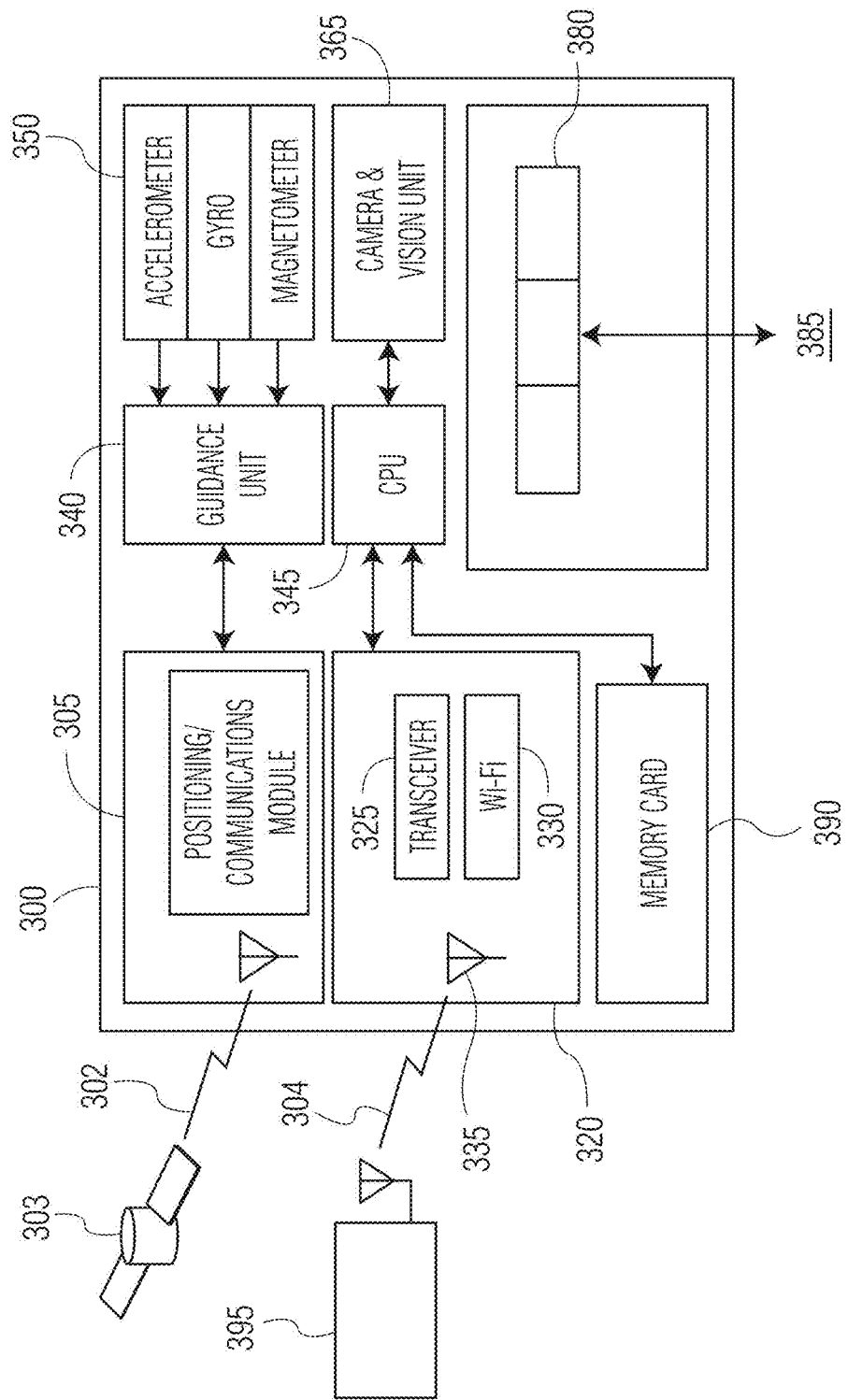
FIG. 3 shows an example of on-board drone systems for use with the system of FIG. 1 according to an embodiment of the invention.

FIG. 3 shows examples of the onboard drone electronics systems in more detail at a functional block level. The electronics 300 can include high precision positioning unit 305 having positioning/communications module (e.g., a GPS or GALILEO based) and antenna which can communicate, via communications link 302, with GPS/GALILEO network 303 such that the drone can obtain positioning data. A communication unit 320 is provided having transceiver 325, Wi-Fi module 330 and antenna 335 which can interface with at least RTK corrections broadcast 395 over communications link 304 such that the drone can more accurately position itself using this data in combination with the GPS data. A guidance unit 340 can communicate with sensors 350 such as accelerometer, gyroscope and magnetometer to help the drone maneuver and locate itself across the landscape. A processing device 345 may communicate with a camera 365 to capture images 20 of the landscape 2 and combine the images with positioning data. The drone has a power unit comprising rechargeable batteries 380 for powering the drone systems which can interface with rechargeable power supply 385 for recharging the drone batteries between flights. The drone may have removable memory card(s) 390 on which the processing unit saves images 20 captured by the camera, which may be removed post flight and may be interfaced to the computing system or otherwise connected to the computing system, e.g. via wireless or wired connection. Alternatively, image data can be transferred to the computing system 100 during the flight in real time or near real time, e.g. over Wi-Fi 330.

Many drones 10 can be equipped with a camera (e.g., a digital RGB camera capturing visible red, green, blue light channels. However, these channels alone may be of limited use for remote sensing mines. Accordingly the camera unit of the present example comprises at least a multispectral camera arranged to capture, in the present example, 5 different channels, including red, green, blue, infra-red and red edge. Thus, 5 images can be captured for each "square" of the area being surveyed. The camera can have a resolution of, for example, between 5 cm per pixel and 1.24 cm per pixel (note that other resolutions are also possible). The cameras and/or drones may include light sensors to capture ambient light readings during flight for each of the bands of the camera. This data can be recorded in the metadata of the images captured by the camera, which may be used by the orthomosaicing software to compensate for lighting conditions.

Soil absorbs radiation from the sun and can be heated, with a resulting change in the infrared radiation that it emits. Landmines can be better insulators than soil. As a result, the soil above the mine can heat faster during the day and can cool faster at night. Infrared sensors may detect anomalies in the heating and cooling cycle compared with surrounding areas. The act of burying a mine can also affect the soil properties, with small particles tending to collect near the surface which can give rise to frequency-dependent characteristics that can be detected by multispectral or hyperspectral imaging. Finally, polarized light reflecting off man-made materials can tend to remain polarized while natural materials can depolarize it; the difference can be seen using a polarimeter. Thus, by harnessing a full range of channels, reflective signatures of landmines can be more easily detected, such as metal, disturbed earth, vapours, etc.

The images 20 can be geotagged at the point they are captured with location data to help stitch together images and so that features detected in the images can be accurately mapped back to the landscape 20. Various schemes can be used to accomplish the geotagging. For example, ground control points can be established at known positions, providing reference points in the captured images which can allow the location to be mapped in post flight processing. In the present example, the drone can have onboard differential GPS (e.g. unit 305) which can reduce the amount of ground control needed. So called "real-time kinematic (RTK)" processing on the drone (e.g. units 395/320) may record GPS information and geotags images as they are captured during flight. The GPS location can be recorded for the center of the image 20 (or any other suitable predefined point of reference). An active base station (e.g. unit 395) on the ground can send raw GPS data to the drone. Then the drone's onboard GPS can combine that info and its own observations to accurately determine its position relative to the base.

A PPK "post-processing kinematic" scheme may be used to process the base station data to improve accuracy. In PPK, the drone can geotag X,Y,Z coordinates to each image based on the on-board GPS unit data. While this is happening, a base station (not shown) can also be recording positional information, but with more accurate triangulation. Post flight, those two sets of GPS data can be matched up using the photo timestamp. Then the initial, less-than-accurate onboard GPS data can be corrected, giving precise geotags for the imagery.

Figure 4:
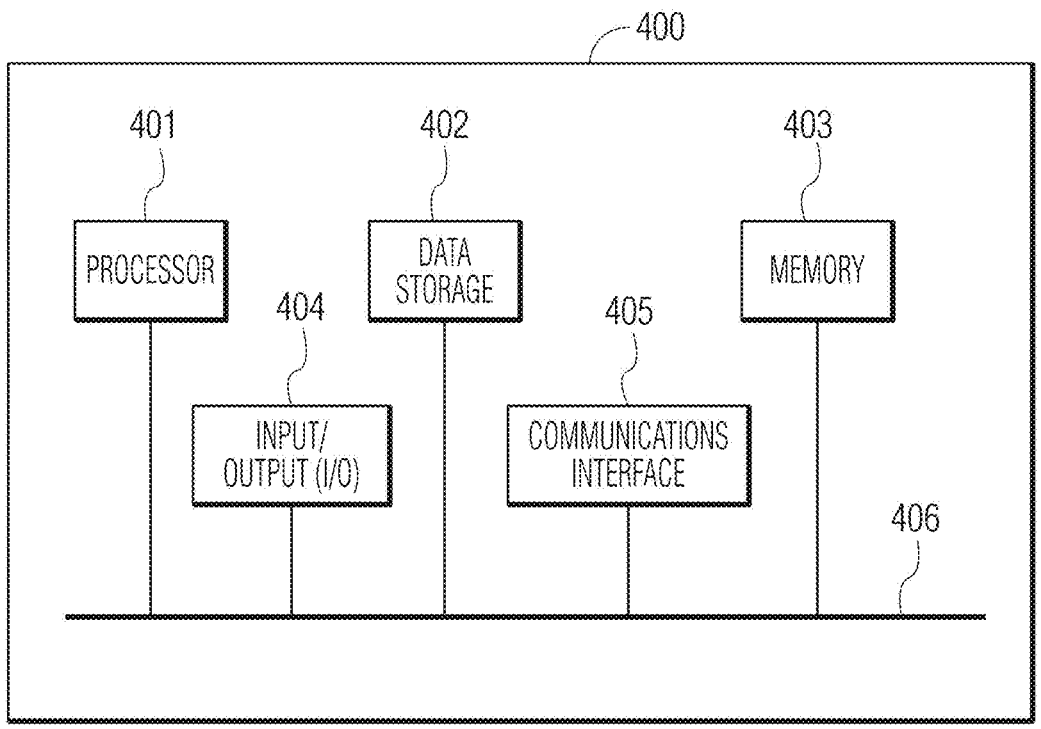
FIG. 4 shows an example of a computer system for use with the system of FIG. 1 according to an embodiment of the invention.

FIG. 4 shows an example computing system architecture 400 for processing the image data in steps 3 to 5, although it will be appreciated that other computer systems, distributed computer systems, cloud based computer system, etc. can be used.

Generally the computer system can comprise any combination of the following: a processor 401, input/output 404 providing a user interface, data storage 402 which can be used to store image data in a file system or database, communications interface 405 and memory 403 for containing programming instructions and working memory, all communicating via a bus 406.

Data storage device 402 and memory 403 can each comprise a tangible non-transitory computer readable storage medium. Data storage device 402, and memory 403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices, or any combination thereof.

Input/output devices 404 may include peripherals, such as a camera, printer, scanner, display screen, etc. Provision may be made for a connector for receiving a memory card, e.g. for transferring data from the drone. Input/output devices 404 may include a display device such as a cathode ray tube (CRT), plasma or liquid crystal display (LCD) monitor for displaying information to the user, a keyboard, and a pointing device such as a mouse or a trackball by which the user can provide input.

The above methods can be used aerially, from a distance, on a drone, but can include imagery from airborne platforms, satellites or other manned or unmanned flight.

A challenge is to process and/or interpret the images in the processing and interrogation steps 203,204. Algorithms can cope with the extreme dependence of performance on environmental conditions, e.g. different lighting conditions, shadow, etc. Many of the surface effects can be strongest just after the mine is buried and their signatures vary over time caused by weathering.

Figure 6:
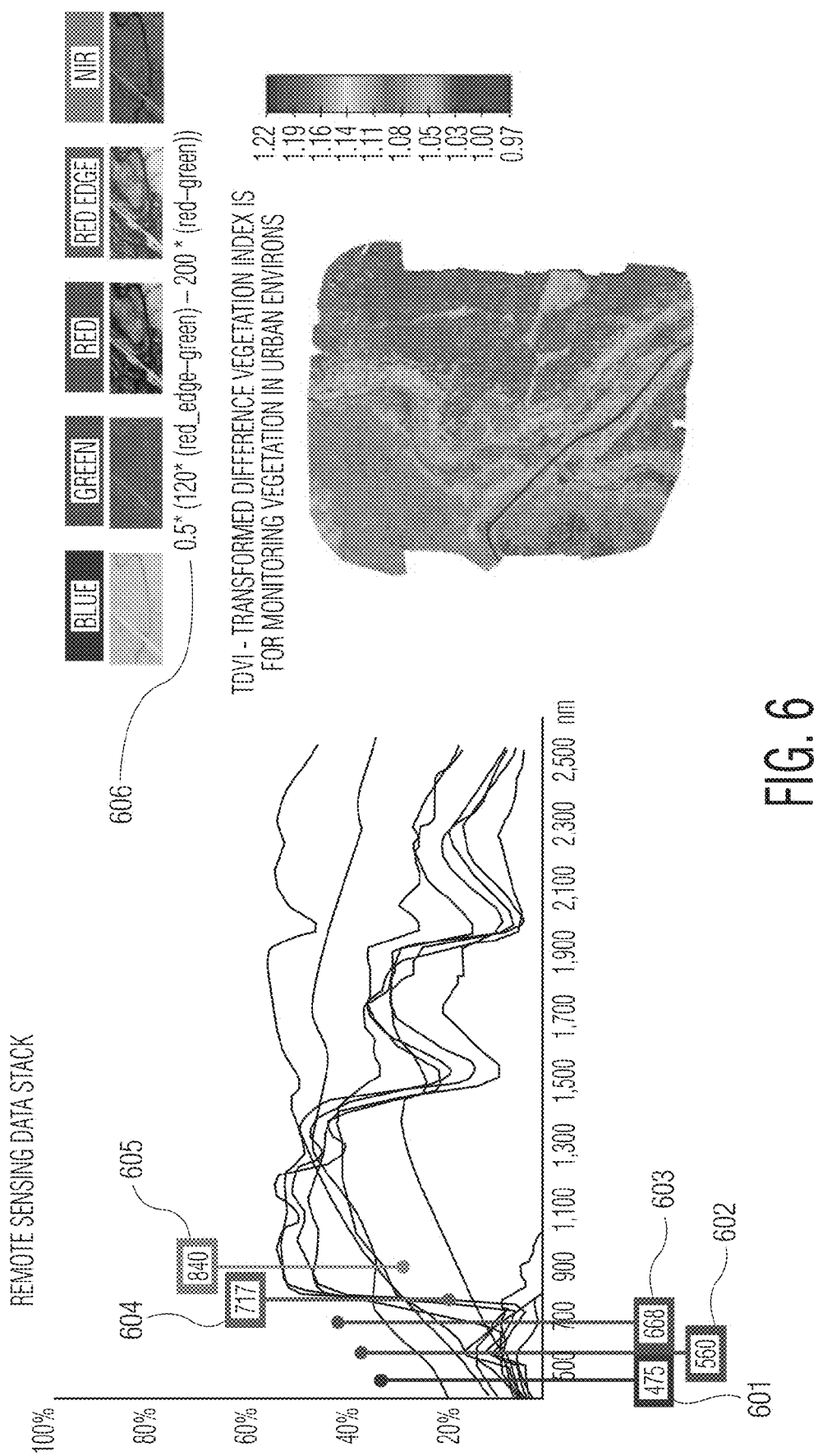
FIG. 6 shows an example of filtering channels received from a multispectral camera according to an embodiment of the invention.

Multispectral and Hyperspectral images can provide both spatial and spectral representations of scenes, materials, and sources of illumination. They can differ from images obtained with a conventional RGB colour camera, which can divide the light spectrum into broad overlapping red, green, and blue image slices that when combined may seem realistic to the eye. A multispectral image may have different and additional channels, including those not visible to a human eye. FIG. 6 shows an example in which images from a multispectral camera can include Red 601, Green 602, Blue 603, Red Edge 604 and Near infrared 605 channels at their respective wavelengths from which a composite image may be formed. A hyperspectral camera can effectively divides the spectrum into very many thin image slices, the actual number depending on the camera and application.

This fine-grained slicing can reveal spectral structure that may not be evident to the eye or to an RGB camera but which may become apparent in a range of visual and optical phenomena. For instance, the spectrum may be sampled at 10-nm intervals over 400-720 nm. At each sample wavelength, there may be a complete intensity (grey-level) representation of the reflectance or radiance in the scene. These may be combined to produce a composite image as desired.

FIG. 6 shows for illustration purposes a Transformed Difference Vegetation Index 606 for monitoring vegetation in urban environments in which pixel values can be a defined combination of corresponding pixel values of red, green, and red-edge channels according to the formula $$(0.5*(120*(red\_edge-green)-200*(red-green)))$$

with the output classified and displayed according to a particular colour palette.

Such filters can be tuned to signatures found in foliage, e.g. to pigments such as chlorophylls and carotenoids, and anthocyanins in autumn, which can give multiple large and small absorbance peaks distributed over the visible spectrum leading to a variety of complex reflectance spectra from region to region, whilst being insensitive to other non-uniformities not of interest.

In the detection of landmines, plural filters may be employed according to the type of terrain and/or landmine being detected, where those filters may be attuned to detecting the signature Once the filter or filters has been applied to combine the images, the software can perform a classification method on the data. Various schemes might be used, for instance: "Equal interval" can divide the range of attribute values into equal-sized subranges. This can allow specification of the number of intervals, and the class breaks based on the value range can be automatically determined. For example, if you specify three classes for a field whose values range from 0 to 300, three classes with ranges of 0-100, 101-200, and 201-300 can be created.

In a "quantile" classification, each class can contain an equal number of features. A quantile classification can be well suited to linearly distributed data. Quantile can assign the same number of data values to each class. There may be no empty classes or classes with too few or too many values.

With natural breaks classification, classes can be based on natural groupings inherent in the data. Class breaks can be created in a way that best groups similar values together and maximizes the differences between classes. The features can be divided into classes whose boundaries may be set where there are relatively big differences in the data values.

A geometrical interval classification scheme can create class breaks based on class intervals that have a geometric series. The geometric coefficient in this classifier can change once (to its inverse) to optimize the class ranges. The algorithm can create geometric intervals by minimizing the sum of squares of the number of elements in each class. This can help ensure that each class range has approximately the same number of values in each class and that the change between intervals is fairly consistent.

A standard deviation classification method can show how much a feature's attribute value varies from the mean. The mean and standard deviation can be calculated automatically.

Class breaks can be created with equal value ranges that are a proportion of the standard deviation—e.g., at intervals of one, one-half, one-third, or one-fourth-using mean values and the standard deviations from the mean.

The software may allow the user to select from any classification scheme and select the number of classes. The output can then be displayed according to a colour palette that the user may choose.

Graduated color symbology can be used to show a quantitative difference between mapped features by varying the color of symbols. Each range in the classified data can be assigned a different color from a color palette to represent the range. For instance, if the classification scheme has five classes, five different symbol colors may be assigned. Typically, a continuous color scheme can be used to apply different shades of the same color so that lighter shades match lower data values and darker shades match higher data values.

Symbol color can be an effective way to represent differences in magnitude of a phenomenon because you can distinguish variations in color if there are relatively few classes. A range of seven colors can be the approximate upper limit of colors that can be clearly distinguished on a map.

The user may be able to modify the color of each symbol class so they can design a custom set of colors that have sufficient variation to make them distinguishable from one another.

The output can then be displayed for review by an operator. The image transformation described above is sensitive to high reflectance from buried or surface explosive devices and displays the results in a form which enables landmines to be more easily detected by an operator.

Figure 7:
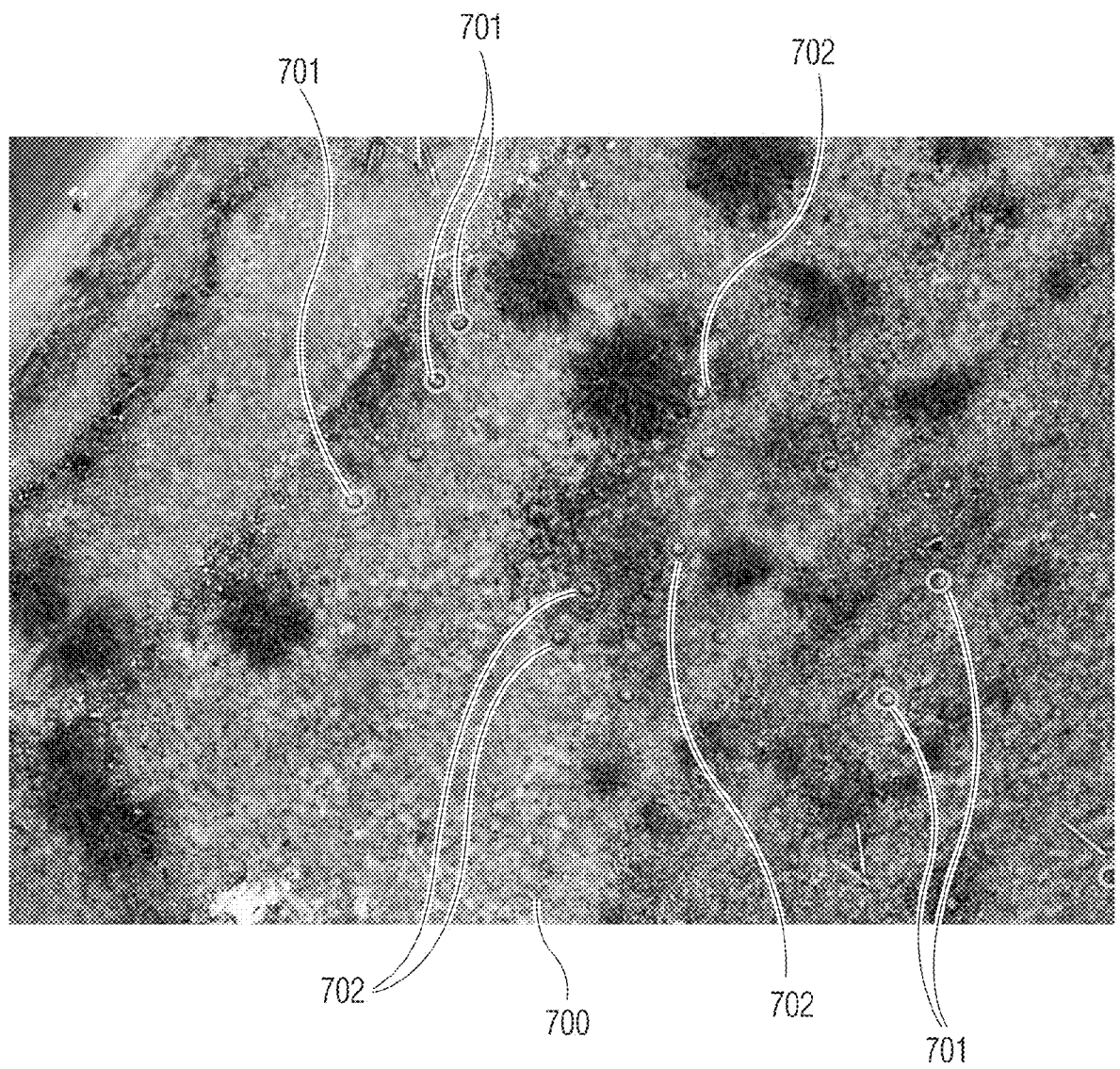
FIG. 7 shows an example of processing RGB image data capturing an area of a minefield according to an embodiment of the invention.
Figure 8:
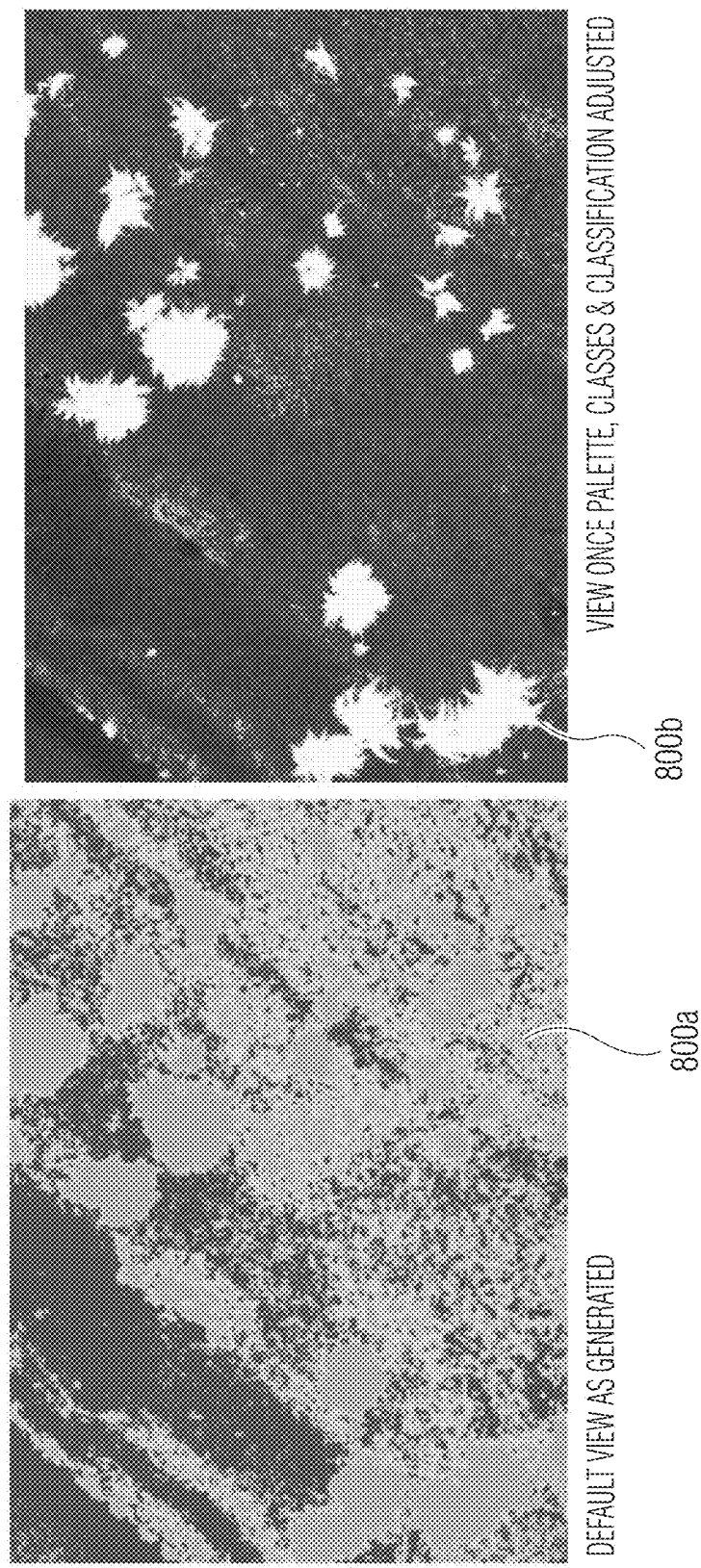
FIGS. 8 and 9 show examples of image data transformed by the processes disclosed herein according to embodiments of the invention.
Figure 9:
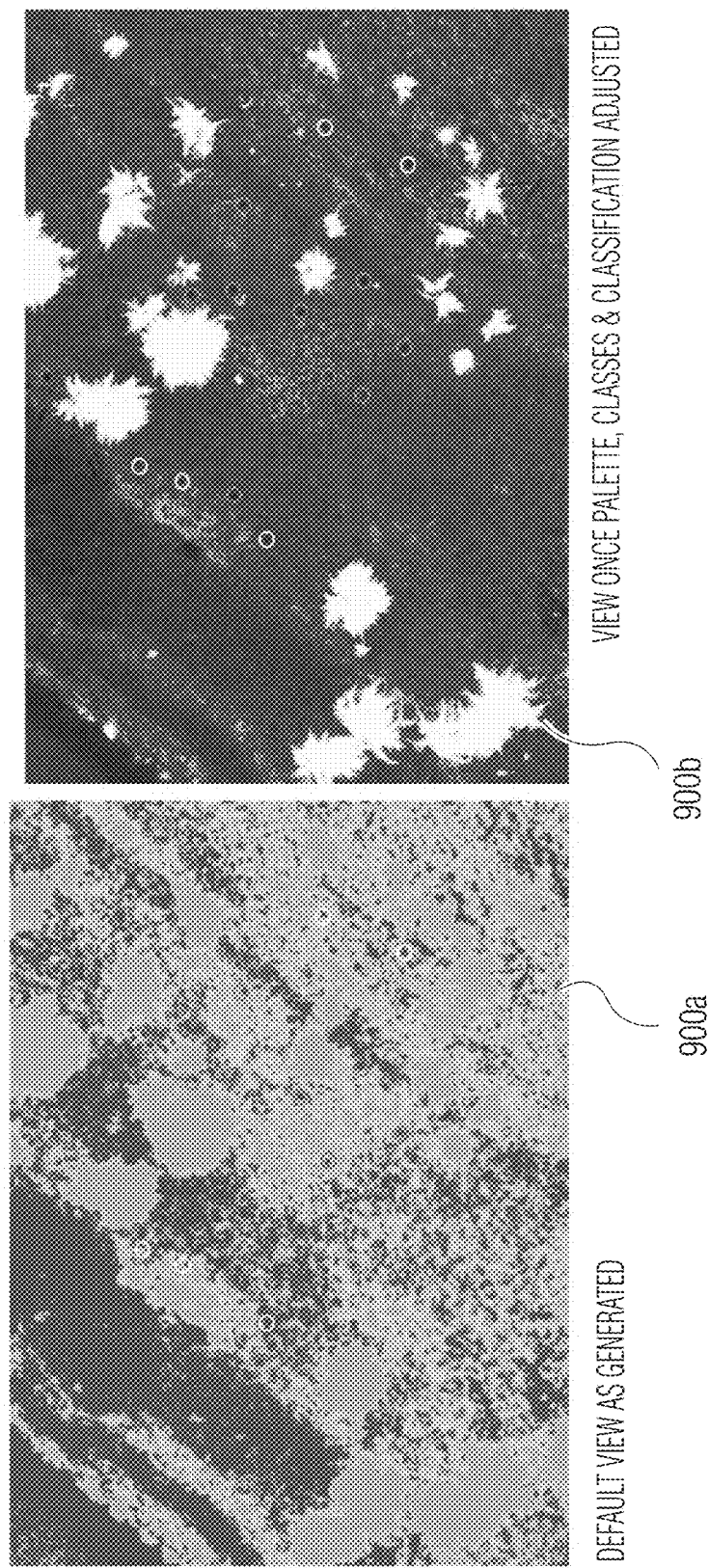

FIG. 7 shows an example aerial image 700 of a mine field with buried and surface mines circled 701,702. FIGS. 8 and 9 show an example multispectral image stack processed in accordance with the methods disclosed herein.

Alternatively or additionally, a user may be guided in performing manual detection of mines or validate a prediction made by AI in an automatic detection mode. Such manual detections/validations can be saved in a database to be used in training AI to perform future detections.

Figure 5:
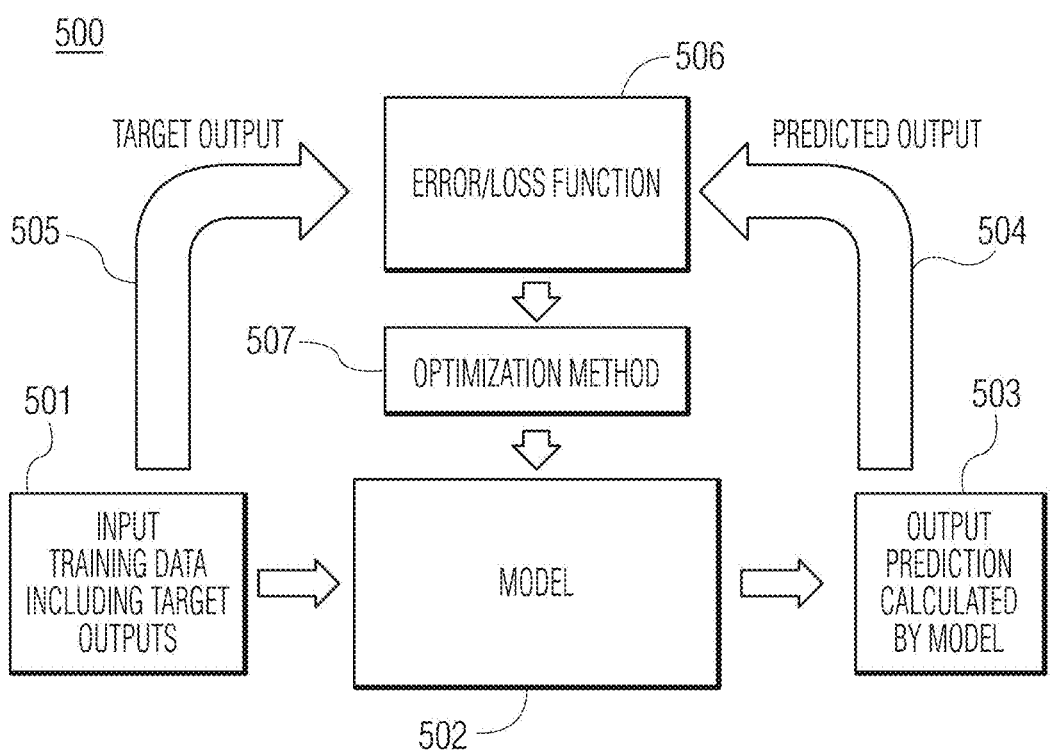
FIG. 5 shows an example of an AI learning model for possible use with the system of FIG. 1 according to an embodiment of the invention.

FIG. 5 shows an example architecture 500 for training AI that can be used to automatically detect mines from the transformed image data.

A set of training data 501 can be prepared comprising the input image data transformed by the methods above, and can be tagged with a human determination of whether a landmine is present, which type of landmine is present, e.g. buried or surface, where in the image the landmine is present, etc. Further input can include details of the weather or terrain.

The AI can include a model 502 that outputs a prediction 503 of whether or not a landmine is present based on the input. The model can be trained by learning from the training data over various epochs of training to iteratively converge to a solution, wherein in each iteration the "error" 506 between the predicted output 504 and the target output 505 from the input data can be fed back to optimise 507 the model, until it fits the input data and can generalize to new input image data to make accurate predictions. Some training data may be held back as validation data. Once the model has been trained, its ability to generalize to new unseen data may be tested on the validation data. For instance, the AI model can be a neural network.

A particular scheme for AI detection is so-called semantic segmentation of the image. This aims to predict the class of each pixel in an image. This is used for the partition of an image into unique parts or objects, such as identifying all cars or people within an image, or features in medical images. Some deep learning methods for semantic segmentation include fully convolutional neural networks (FCN) convolutional auto-encoders such as the U-Net and Deep-Lab.

As opposed to semantic segmentation, there also exist solutions using deep learning for instance segmentation, where each object instance can be identified within an image (e.g. car 1, car 2, car 3, etc. . . . ). Some popular instance segmentation solutions can include Mask-RCNN.

For the present application, semantic segmentation can be used, for instance using a standard U-Net. The U-Net network architecture can be structured into an encoder and a decoder. The encoder can follow the classic architecture of the convolutional neural network, with convolutional blocks each followed by a rectified linear unit (ReLU) and a max polling operation to encode im-age features at different levels of the network. The decoder up-can sample the feature map with subsequent up-convolutions and concatenations with the corresponding encoder blocks. This network style architecture can help to better localize and extract image features and assembles a more precise output based on encoder information.

The model can first be created using the training dataset by comparing the training data with expected output to establish optimal weights with back-propagation rules. Validation data can then be used to establish the optimal number of hidden units to verify a stopping point for the back-propagation algorithm of the trained model essential for model selection. The test dataset can be utilized to establish the accuracy of the model from the fully trained final model weights. The test and validation datasets can be categorized independently to ensure accuracy as the final model is biased toward the validation data used to make final model selection.

Figure 10:
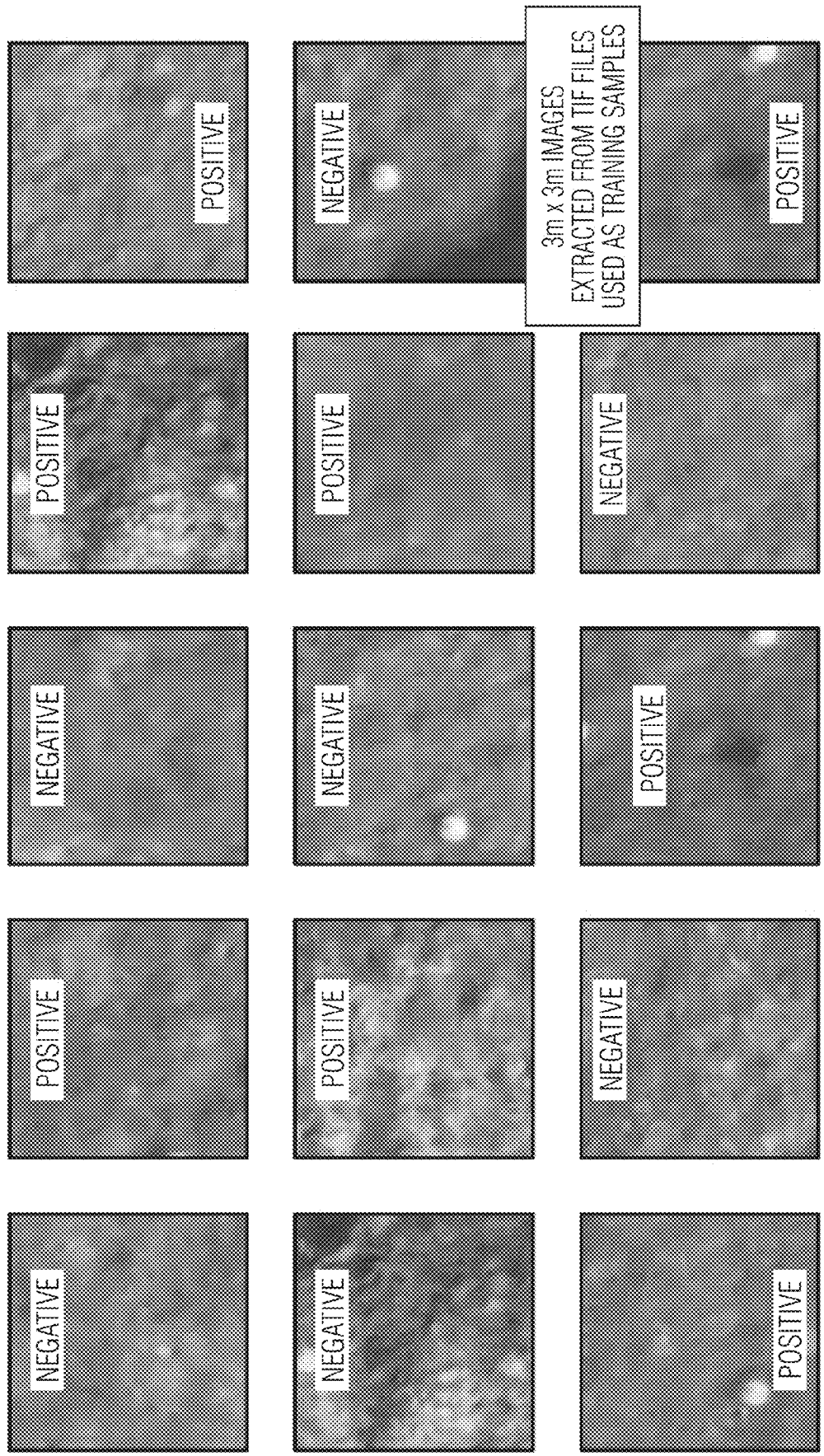
FIG. 10 shows examples of image samples showing positive and negative instances of landmine detection according to embodiments of the invention.

To train the model, clear landmine samples may be needed (e.g., positive and/or negative). The first step can be the management of the loading of very large, high-resolution imagery in smaller memory efficient blocks. The original orthomosaic image, e.g. in geotiff format, from the drone surveying can be at high resolution (e.g. 40 GB or 80 GB) and can cover many square miles. FIG. 10 shows an example of smaller image "tiles" extracted from the overall geotiff image used as training samples, which in this example are 3 m by 3 m image tiles, showing positive and negative instances of landmines. These can be taken from RBG images or multi- or hyper-spectral images including one or more infra red channels as discussed above.

Images may be pre-processed using any suitable technique to standardize the appearance and improve image contrast, e.g. sharpen the image. Images may be down-sampled from the original size to a smaller size (e.g. 512×512 pixels) using for example interpolation techniques. Down-sampling may be useful to aid back-propagation and neural network learning within graphics processor unit (GPU) memory constraints.

Supervised Deep Learning models can be largely reliant on the amount of data available during training. Data augmentation can synthesize new data by modifying original images. These augmented images, along with the original images, can be fed to the neural network. This can avoid overfitting, meaning better generalization can be achieved. Suitable data augmentation techniques can include one or more of: Rotating, Scaling, Translating, Flipping, Adding Gaussian noise to input images etc.

In additional to increasing training samples exponentially, data augmentation can introduce sample diversity. For example, changing the brightness in training samples may reflect brightness differences during different times of the day when arial footage is captured. In addition, a landmine detected in low light can be easier to spot in high light.

Augmented images may also reflect varying terrains. This can allow the model to train on what appears to be changes in terrain, even if they are derived from one area, at one time.

Figure 11:
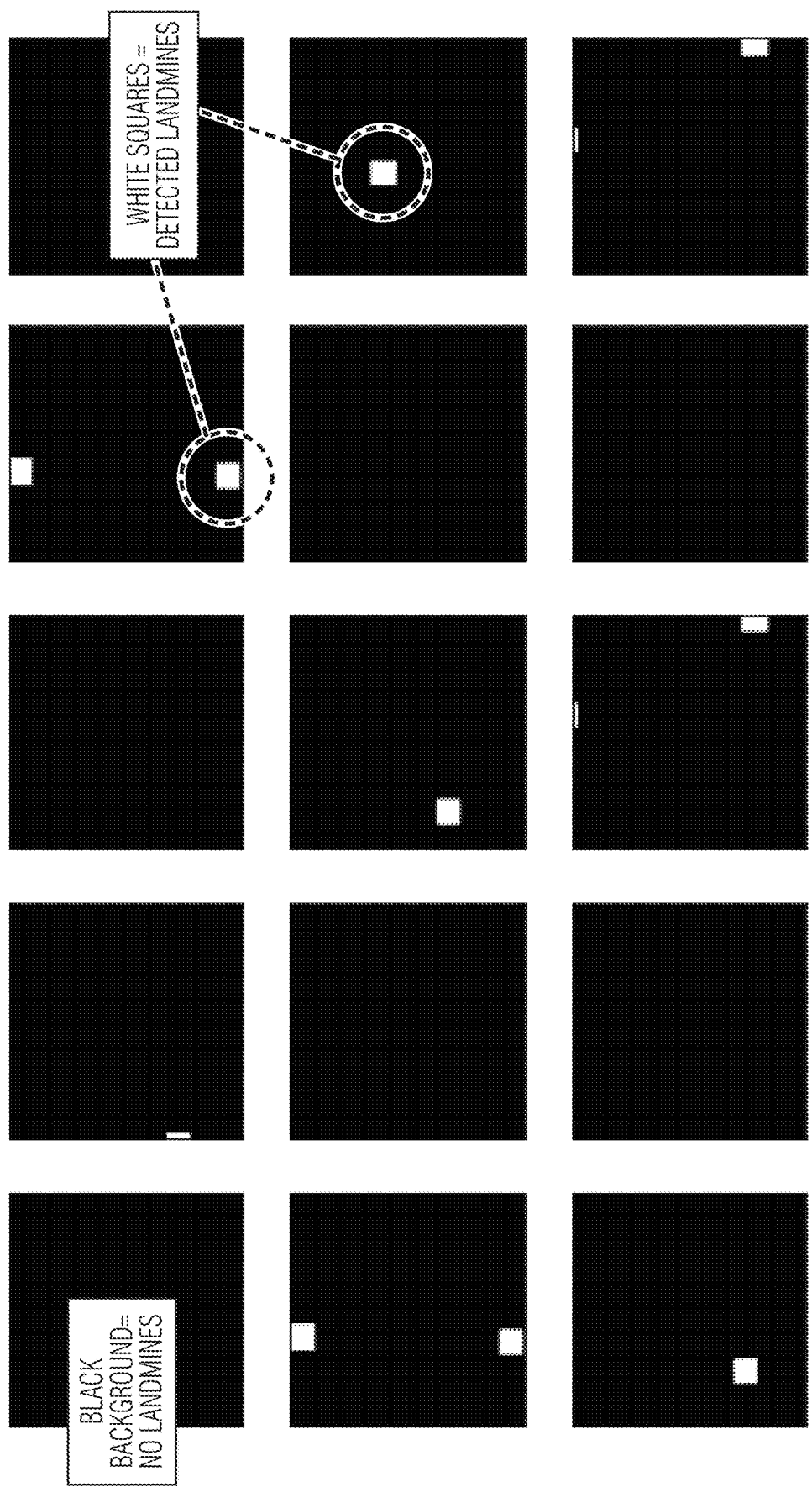
FIG. 11 shows examples of ground truth mask raster images labelling the image samples of FIG. 10 into positive landmine detection and no landmine detection classes according to embodiments of the invention.

FIG. 11 shows ground truth masks corresponding to the input images, e.g. raster images including ground truth labels that are colour coded with the black "background" indicating no landmine is present and the white "boxes" delineating (outlining) the location of a detected landmine, i.e. masking off the relevant landmine pixels. These may be similarly down-sampled to match the input images. These masks can be "true" segmentations of the image, typically made by human experts reviewing image data or validating predictions of the AI. The masks can thus "label" the input images as containing zero or more landmines (plural landmines may be present in a tile).

The model can then be trained on the image tiles and masks to learn to make predictions for landmine detection based on input images. The Neural network may follow an encoder/decoder structure where the spatial resolution of the input is downsampled, developing lower-resolution feature mappings which are learned to be highly efficient at discriminating between classes, and then upsample the feature representations into a full-resolution segmentation map. The neural network may comprise in the order of 2 million trainable parameters.

The model may be trained on as little as a couple of hundred images. However, for example, in the order of 1000s of images can be used from varying terrains, and it is anticipated that as the model is used, positive landmine detection samples can be added to the training database to allow the model to be refined. Also, the number of images may be increased with image augmentation. Key performance metrics can be monitored and optimised using hyper-parameter tuning algorithms. To quantify how good an automated segmentation is with respect to the ground truth, we can use a performance measure such as IOU (Intersection over Union, also known as the Jaccard Index)—which is a popular metric which can measure the amount of overlap between the ground truth segmentation and the automated segmentation produced by the algorithm in question. As discussed in relation to FIG. 5, validation data may be used to check whether the model has learned to generalize predictions to new data. Thus, for example, where the model has been trained on 1000 images, 100 may be kept as validation data.

Figure 12:
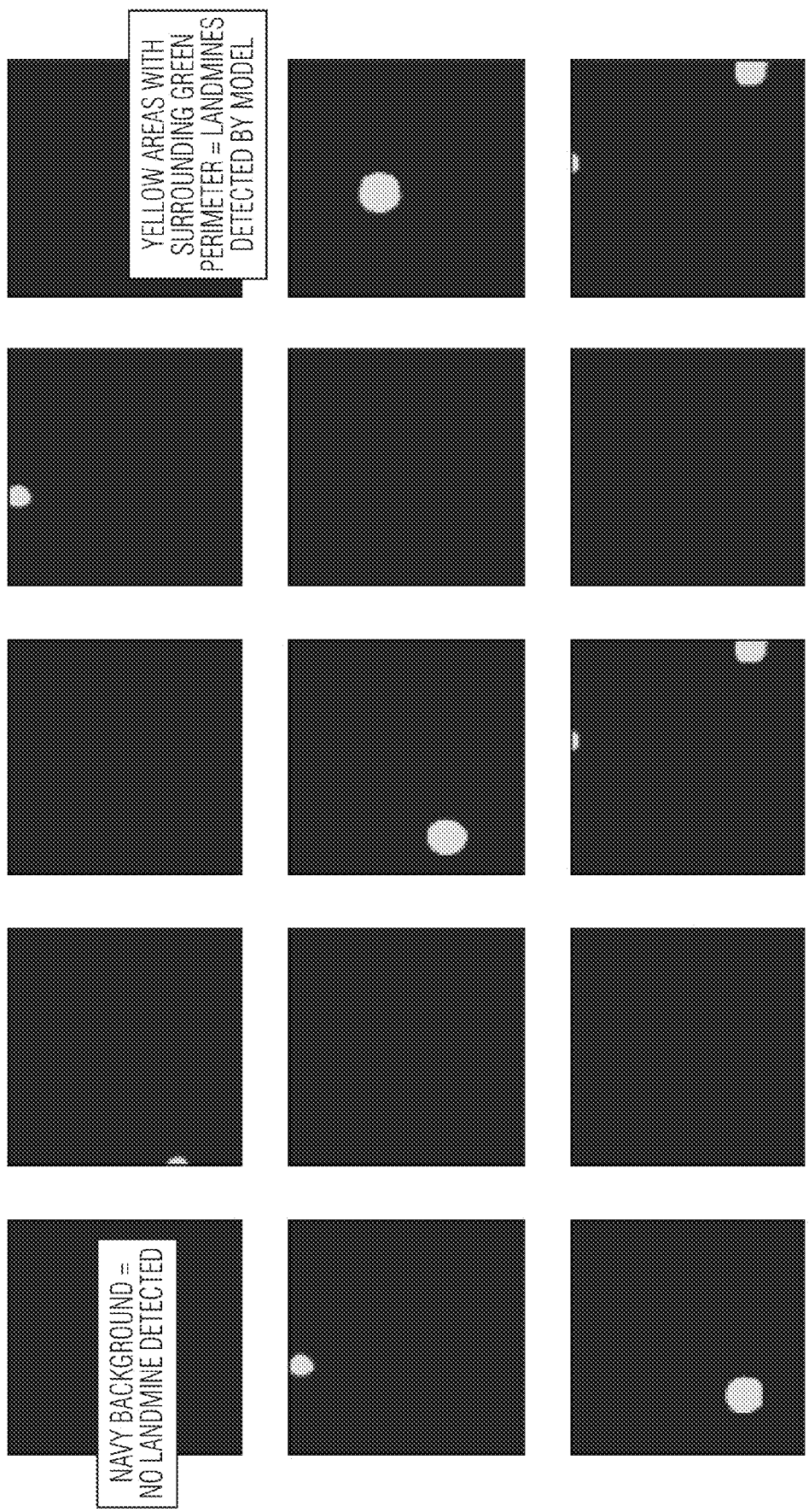
FIG. 12 shows an example of the output of a deep convolution neural network model trained on the data of FIGS. 10 and 11 to output a prediction heatmap of whether a landmine is detected in an input image sample, according to an embodiment of the invention.

FIG. 12 shows the output of the model, once trained, for the input images. The output is a raster image in the form of a prediction mask, e.g. a heatmap where the dark background indicates no landmine detected, and the light areas indicate landmines detected by the model.

This will be paired with the geospatial information that will be extracted from tiff files on input, to detect exact coordinates of predicted landmines. In particular, the image samples input to the model are not GIS (Geographic information system), e.g. not in any spatial context once the image tiles have been extracted from the geotiff. Once the model has processed the image samples, the outputs can be given back spatial context by adding back the geospatial information by, for example, recording the relative position of the image tile on which the prediction has been made in the geotiff. The detections may be merged and consolidated into a single file (e.g. GeoJSON, ESRI Shapefile) that can be read by GIS and visualize the positions of predicted surface anti-tank landmines. Thus, the output presented to the user may be several layers including the multispectral channels and an overlay layer indicating possible landmine detections.

The model may be implemented in software which also provides a user interface for controlling the process. Thus, the software may provide a user interface allowing different image files to be loaded from storage, running the model and allowing the output of the model, i.e. the heat map, to be displayed, zoomed, panned, etc. The software may also allow for user validation of the predictions, leading to positive (and/or negative) results being added to a database of training samples for refining the model. The output heat map may be used to automatically generate a truth map for labelling the input image in the case of positive matches. Thus, a training database may be developed of raster input images and truth masks labelling positive landmine detections within the images, together with any metadata that is applicable, e.g. type of landmine, locations co-ordinates, etc.

In the example given above a single class is used with the image segmentation, e.g. landmine detection or not. In other examples, more than one class can be used, e.g. to detect different types of landmine or ERWs, or labeling objects that might be confused with landmines, e.g. hubcaps, etc., as negative examples to allow the model to learn to better discriminate.

As an alternatively to semantic segmentation, bound and box techniques could be used. This may use convolutional neural networks with a similar structure to semantic segmentation, but instead of outputting a heatmap, e.g., contours, the output can be two coordinates defining a box around the detected landmine. Bounding box deep learning models can be composed of an object detector and a regressor. The object detector can be responsible for identifying which pixels in an image belong to an object, and the regressor can be responsible for predicting the coordinates of the bounding box around that object. After both the object detector and regressor have been trained, they can be combined into a single model that can be used to detect and localize objects in new images. The model can be trained on image samples and the two coordinates of landmines can be detected in the image by a human user. This in some instances may be simpler than semantic segmentation as the output may already be in coordinates which may be simply mapped back to spatial position, whereas for the heatmap produced by semantic segmentation it may be necessary to include an additional step of locating the "blob" in the output image and finding its position coordinates, e.g. at its centre.

A data processing pipeline can comprise any combination of the following:
1. Manage the loading of very large, high-resolution imagery in smaller memory efficient blocks.
2. Read and store the image metadata (geographic coordinate system, pixel resolution etc.)
3. Methods to post-process the image (e.g. resizing and sharpening)
4. A deep convolutional neural network previously trained on thousands of land mine instances in varying terrains designed to detect the presence of land mines in the image and return bounding-box coordinates.
5. A (e.g., final) data process to merge and consolidate the detections into a single file (can be GeoJSON, ESRI Shapefile) that can be read by GIS and visualize the positions of predicted surface anti-tank landmines.

The final outputs can augment the analysts in the identification of surface land mines and can dramatically reduce the time to identify a "hotspot" where landmines are located in long strategic strips.

The models may be implemented on remote servers. For instance, the models may be implemented in the cloud, such as Azure, AWS, etc. Image data can be uploaded to the model in the cloud from the survey site, processed and fed to the model to produce output predictions, which can then be output to the user for display. Alternatively, the models may be run "in the field" on local server hardware.

CONCLUSION

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer implemented method of image processing for detection of explosive devices, the method comprising:
   receiving image data comprising aerial multispectral image data and/or aerial image data covering an area of terrain, wherein the image data comprises plural spectral channels in an electromagnetic spectrum;
   filtering the image data to provide output image data according to at least one filter in which each pixel value is a function of plural input image pixel values, wherein the at least one filter passes high reflectance from buried explosive devices and/or surface explosive devices;
   classifying the output image data into plural classes according to a classification scheme;
   applying a palette for displaying a classified image data, such that at least one class indicates a suspected explosive device with high contrast relative to surrounding areas; and
   interrogating the classified image data to detect explosive devices wherein detection is based on at least a shape of high contrast areas in the classified image data.

2. The method of claim 1, wherein the classification scheme comprises one or more of:
   natural breaks,
   equal counts,
   equal intervals, or
   any combination thereof.

3. The method of claim 1, wherein a number of classes is user adjustable.

4. The method of claim 1, wherein the palette is selectable from plural palettes.

5. The method of claim 1, wherein input data is receivable from an Unmanned Aircraft System flown at an altitude of between 5 m and 120 m.

6. The method of claim 5, comprising interrogating an output image to detect explosive devices based on a classified output image, wherein detection is based on:
output pixel values, proximity to other areas of interest, contrast with surrounding areas, or other GIS landscape data, or any combination thereof.

7. The method of claim 6, comprising:
iteratively training an AI system based on labelled input data to detect explosive devices.

8. The method of claim 7, wherein the AI system comprises a neural network.

9. The method of claim 7, wherein labelling comprises: a data ground truth mask indicating whether an image or portion of an image contains a landmine; and/or metadata comprising: mine type, time of day, weather, or GIS landscape data, or any combination thereof.

10. The method of claim 1, wherein the aerial multispectral image data comprises at least five channels comprising Red, Green, Blue, red edge, and near infrared.

11. The method of claim 1, comprising:
receiving geotagged input images according to GPS data captured by a drone and/or triangulation position data of the drone; and
creating an orthomosaic from plural images to obtain a larger image comprising a geotiff image covering the area of interest.

12. The method of claim 11, comprising receiving calibration images from drone cameras and calibrating a landscape images prior to processing.

13. A system for detecting explosive devices, comprising:
a processing device which when executing programming instructions is arranged to:
receive image data comprising aerial multispectral image data and/or aerial image data covering an area of terrain, wherein the image data comprises plural spectral channels in an electromagnetic spectrum;
filter the image data to provide output image data according to at least one filter in which each pixel value is a function of plural input image pixel values, wherein the at least one filter passes high reflectance from buried explosive devices and/or surface explosive devices;
classify the output image data into plural classes according to a classification scheme;
apply a palette for displaying classified image data, such that at least one class indicates a suspected explosive device with high contrast relative to surrounding areas; and
interrogate the classified image data to detect explosive devices wherein detection is based on at least a shape of high contrast areas in the classified image data.

14. The system of claim 13, comprising an AI module arranged to interrogate the output image data to detect explosive devices based on the classified image data, wherein the AI module iteratively trains an AI system based on labelled input data to detect explosive devices.

15. The system of claim 13, comprising a drone arranged to capture geotagged image data and to transfer the geotagged image data to the processing device.

16. The method of claim 1 comprising:
inputting filtered image data into a model trained to detect a presence or an absence of an explosive device in the image data, wherein the model comprises a convolutional neural network which automatically outputs a heat map prediction of whether or not an explosive device is present; and
providing output to a user indicating the heat map prediction.

17. The method of claim 16, wherein a neural network is iteratively trained to perform one or both of:
semantic segmentation of the image data on a training data set, the semantic segmentation comprising image samples and corresponding ground truth masks labelling whether or not the explosive device is present in a sample; and
bounding box detection on the training data set, the bounding box detection comprising the image samples and corresponding coordinate labels of a location of the explosive device present in the sample.

18. The method of claim 16, wherein the image data comprises plural spectral channels in the electromagnetic spectrum, and wherein the method further comprises:
prior to inputting image data to the model, filtering the image data to provide output image data according to a filter in which each pixel value is a function of plural input image pixel values, wherein the filter passes high reflectance from buried explosive devices and/or surface explosive devices.

19. The method of claim 16, wherein preprocessing comprises one or more of: downsampling, sharpening, and image augmentation operations.

20. Software stored on a computer readable medium comprising program instructions which when executed by a processing device cause the processing device to perform the method of claim 1.

* * * * *